United States Patent [19]

Ivannikov et al.

[11] Patent Number: 4,929,812
[45] Date of Patent: May 29, 1990

[54] METHOD FOR ELECTRICAL ARC SPOT WELDING WITH CONSUMABLE ELECTRODE

[75] Inventors: Alfred V. Ivannikov; Vladimir Z. Abudardin, both of Leningrad, U.S.S.R.

[73] Assignee: Tsentr Nauchno-Tekhnicheskogo Tvorchestva Molodezhi "ASTRON", Leningrad, U.S.S.R.

[21] Appl. No.: 410,014

[22] Filed: Sep. 20, 1989

Related U.S. Application Data

[63] Continuation of Ser. No. 134,783, filed as PCT SU86/00013 on Feb. 20, 1986, published as WO87/04955 on Aug. 27, 1987, abandoned.

[51] Int. Cl.$^5$ .............................................. B23K 9/28
[52] U.S. Cl. ..................................... 219/137.2; 219/73
[58] Field of Search .................. 219/73, 73.1, 74, 127, 219/137.2

[56] References Cited

U.S. PATENT DOCUMENTS

| | | | |
|---|---|---|---|
| 3,102,948 | 9/1963 | McCampbell | 219/127 |
| 3,604,889 | 9/1971 | Rohrberg | 219/74 |

FOREIGN PATENT DOCUMENTS

| | | |
|---|---|---|
| 2953561 | 8/1984 | Fed. Rep. of Germany . |
| 59-209479 | 11/1984 | Japan . |
| 556008 | 6/1977 | U.S.S.R. . |
| 743805 | 6/1980 | U.S.S.R. . |

Primary Examiner—Leo P. Picard
Assistant Examiner—Lincoln Donovan
Attorney, Agent, or Firm—Ladas & Parry

[57] ABSTRACT

A method according to the invention comprises fixing a consumable electrode (1) with respect to a current carrying device (2), positioning it over a surface (4) of a part (5) to be fused, firing a welding arc (8) between the end face (3) of the electrode (1) and the surface (4) of the part (5). The electrode (1) is then fed to a fusion space (9) by swiftly bringing the current carrying device (2) close to the surface (4) of the part (5) at a speed exceeding the rate of fusion of the electrode (1).

2 Claims, 1 Drawing Sheet

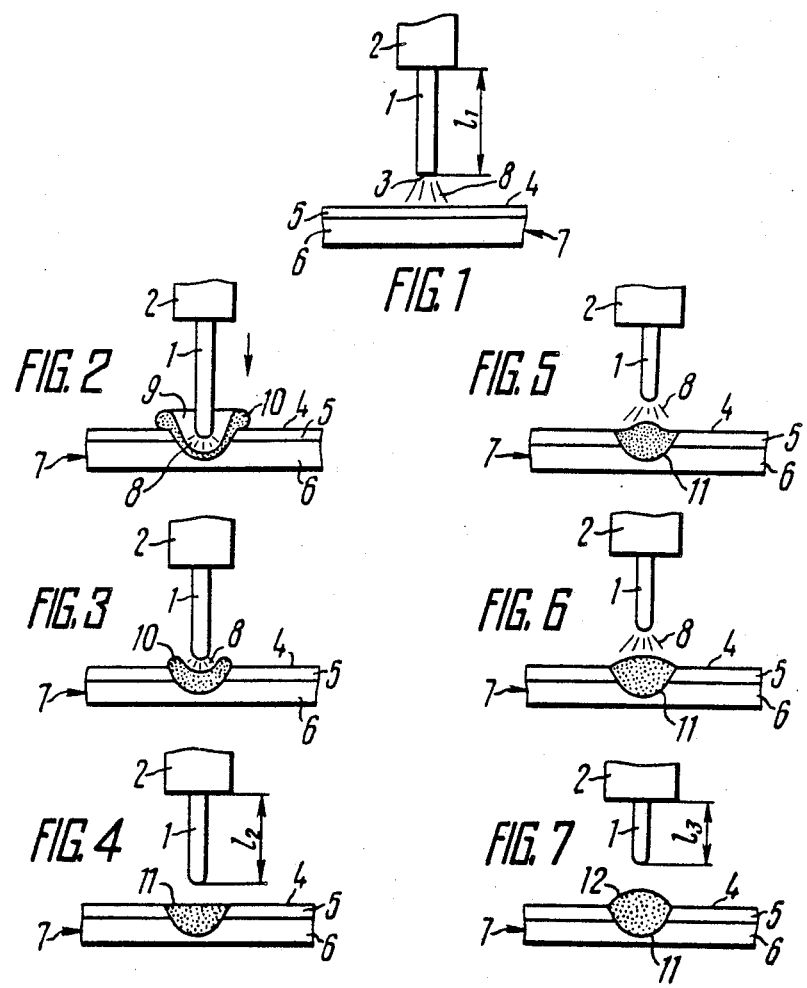

METHOD FOR ELECTRICAL ARC SPOT WELDING WITH CONSUMABLE ELECTRODE

This is a continuation of co-pending application Ser. No. 07/134,783 filed as PCT SU86/00013 on Feb. 20, 1986, published as WO87/04955 on Aug. 27, 1987, now abandoned.

TECHNICAL FIELD

The invention relates to the arc welding with a consumable electrode, and more specifically, it deals with a method for electrical arc spot welding with a consumable electrode.

BACKGROUND OF THE INVENTION

Known in the art is a method of submerged arc spot welding which is carried out by means of an apparatus described in the book "Studies on, and Production Experience of Welding", in Russian, Yu. M. Slesarev "Weld-Plug Welding in the Construction and Road Building Mechanical Engineering", Mashgiz Publishing House, 1955, pp. 75–76. The method comprises securing a consumable electrode fast with respect to a current carrying device firing a welding arc between the end face of the consumable electrode and the product surface. The consumable electrode is not fed into a fusion space thus formed: it is rather fused only by stretching the welding arc as the electrode is consumed to an amount equal to the breaking length of the welding arc. At the moment the welding arc is fired, the end face of the consumable electrode is moved away from the surface of a product, and the welding current decreases.

While the abovedescribed method is very simple in practical implementation, it is rather inefficient because of a low concentration of heat release at the weld spot, a longer welding cycle time, increased specific consumption of welding materials and electric energy, the major part of electric energy being spent for building-up an excessive reinforcement of the weld spot. The fusion capacity of the welding arc is very low, and quality of the resultant weld spots is poor. Therefore, this method is only suitable for welding non-vital thin-walled structures.

Known in the art is a method for welding using weld plugs (SU, A, 108233) wherein welding is carried out with an electrode having a coating and fixed during welding with respect to a current carrying device (electrode holder), the electrode being fused during gradual feed into the fusion space with a substantially constant value of welding current.

As compared with the abovedescribed method, this method has a wide field of application owing to the feeding of the consumable electrode into the fusion space at a rate equal to the fusion rate and allows welding of thicker joints to be carried out with holes of the upper part being melt-shut with the electrode metal.

At the same time, a low electrode feed rate, the presence of the electrode coating and a low density of current which can be permitted in the electrode with this welding technique cause a very low concentration of heat investment in the weld spot, low fusion capacity of the welding arc, long duration of welding cycle, increased consumption of welding materials and electric energy and poor quality of welded joints.

Known in the art is a method of electrical arc spot welding with a consumable electrode which is carried out by means of an arc spot welding device (cf. Studies on, and Production Experience of Welding, Yu. M. Slesarev, "Electric Weld Plug Welding in Construction and Road Building Mechanical Engineering, Mashgiz Publishing House, 1955, pp. 78–79), wherein the submerged welding technique is used. A consumable electrode is fixed with respect to a current carrying device, the electrode is positioned over the surface of a part being fused, a welding arc is fired between the end face of the consumable electrode and the part surface. The electrode is fused by gradually lowering the current carrying device with the electrode, with the welding current and arc length remaining practically unchanged. The end face of the consumable electrode remains over the surface of the part being welded during the whole welding period, at a distance therefrom substantially equal to the welding arc length, and the end face of the consumable electrode is moved away from the part surface at a still greater distance at the moment the welding is over when the welding arc is stretched. The molten metal of the electrode is transferred to the weld spot in the form of large-size drops. A weld spot (electric weld plug) which is thus formed has a large reinforcement and small working area of fusion.

Owing to a power-assisted feed of the consumable electrode to the fusion space and protection of the welding arc with flux this method features somewhat higher heat concentration at the weld spot and fusion capacity of the welding arc as compared to the abovedescribed methods.

However, as the consumable electrode in this method is fed to the fusion space slowly, at a rate equal to the rate of its fusion, the welding process occurs with an extended (longer) welding arc occurring over the surface of a part being fused. This results in a low concentration of heat investment to the weld spot, longer duration of welding cycle, increased consumption of welding materials and electric energy, the major part of energy being spent uselessly to achieve an excessive reinforcement of the weld spot; a weld spot cannot be produced without reinforcement, and welded joints are of a poor quality.

SUMMARY OF THE INVENTION

The present invention is based on the problem of providing a method of electrical arc spot welding with a consumable electrode, wherein conditions of the consumable electrode feeding to the fusion space and conditions of the formation of a weld spot make it possible to cut down the welding cycle time, obtain a weld spot without reinforcement and lower consumption of welding materials and electric energy.

The above problem is solved by that in a method of electrical arc spot welding with a consumable electrode, comprising fixing a consumable electrode with respect to a current carrying device, positioning the consumable electrode over the surface of a part to be fused, firing a welding arc between the end face of the consumable electrode and the surface of the part to be fused, feeding the consumable electrode to the fusion space and carrying out the welding to form a weld spot, according to the invention, the consumable electrode is fed to the fusion space by swiftly bringing the current carrying device close to the surface of the part being fused at a speed exceeding the rate of fusion of the electrode.

It is preferred that, with a swift reduction of the electrode extension, the end face of the consumable electrode to be submerged in the fusion space below the level of the surface of the part being fused at a depth of at least one percent of the thickness of the part being fused, the welding being started from the moment a welding arc is fired and completed at the moment the electrode metal transfer to the weld spot begins.

The invention makes it possible to achieve tenfold and even greater reduction of welding duration and consumption of welding materials and improves productivity of welding. Energy consumption is several times lower, quality of welded joints is substantially improved, welding deformations are materially reduced and external appearance of products is greatly improved.

BRIEF DESCRIPTION OF THE DRAWINGS

The invention will now be described with reference to specific embodiments illustrated in the accompanying drawings, in which:

FIG. 1 shows relative position of a consumable electrode current carrying device and a product being welded at the initial stage of welding according to the invention;

FIG. 2 shows a stage of welding, involving the beginning of feed of a consumable electrode to the fusion space according to the invention;

FIG. 3 shows a stage of welding involving the end of feed of a consumable electrode to the fusion space according to the invention;

FIG. 4 shows a stage of welding involving deenergization of welding arc and formation of a weld spot without reinforcement according to the invention;

FIG. 5 shows a stage of welding involving continuation of welding and beginning of the formation of a reinforcement at the weld spot according to the invention;

FIG. 6 shows an intermediate stage of the process of formation of a reinforcement at the weld point according to the invention;

FIG. 7 shows the final stage of the process of formation of the weld spot according to the invention.

BEST MODE FOR CARRYING OUT THE INVENTION

A method for electrical arc spot welding with a consumable electrode according to the invention is carried out in the following manner.

A consumable electrode 1 (FIG. 1) inserted in a welder is fixed with respect to a current carrying device 2 with a pre-set value of extension $l_I$ of the consumable electrode 1. The value of $l_I$ is chosen depending on diameter of the electrode 1 and desired welding conditions. Then the end face 3 of the consumable electrode 1 is positioned over a surface 4 of a part 5 to be fused which is to be welded with a part 6 of a product 7. Then a protection of a predetermined welding zone against ambient air is provided either by means of a flux or using a protecting atmosphere, and a welding arc 8 is fired between the end face 3 of the consumable electrode 1 and the surface 4 of the part 5 being fused. The welding arc 8 is fired either by means of an oscillator or by any other appropriate known means. The current carrying device 2 is then swiftly brought close to the surface 4 of the part 5 in the direction of arrow (see FIG. 2) so that the length of the welding arc 8 is instantaneously shortened. This will result in a very rapid growth of welding current, a high current density obtains, and the metal of the consumable electrode 1 starts intensively evaporating from the end face 3 thereof.

The speed of such feed of the consumable electrode 1 shall in any case be higher than the rate of its fusion so that the end face 3 of the electrode 1 will be submerged below the surface 4 of the part 5 being fused. This facility provides for a very high concentration of heat release in the metal of the parts 5 and 6 of the product 7. The depth at which the end face 3 of the electrode 1 is submerged into a fusion space 9 should be such that the entire welding arc 8 be disposed below the surface 4 of the part 5. It is only under such conditions that maximum possible concentration of heat release in the parts 5 and 6 being welded can be achieved, fusion capacity of the arc 8 can be improved and welding quality bettered. Consequently in order to guarantee these high performance features, it is necessary to submerge the end face 3 of the electrode 1 into the fusion space 9 below the surface 4 of the part 5 being fused at a depth which is at least one percent of the thickness of the part 5. It should be noted that, depending on a specific process objective, the submergence of the end face 3 into the fusion space 9 may be effected at a depth equal to, or greater than the thickness of the part 5 being fused.

Molten metal 10 of the product 7 displaced by the welding arc 8 will clear the way for the compressed welding arc 8 thus ensuring a superhigh concentration of heat release in the metal of the product 7.

The feed of the consumable electrode 1 into the fusion space 9 is then stopped (FIG. 3). As evaporation of metal of the consumable electrode from the end face 3 thereof continues, the length of the welding arc becomes somewhat greater and pressure exerted by the arc 8 upon the molten metal 10 decreases. The displaced molten metal 10 consisting of the molten metal of the parts 5 and 6 of the product 7 being welded, which is contained by surface tension and gravity forces, starts returning to the initial position. The welding arc 8 is then deenergized. The welding process is thus completed, and a weld spot 11 (FIG. 4) is obtained without a reinforcement (enlargement) protruding from the surface 4 of the part 5 of the product 7.

After the weld spot 11 without reinforcement has been obtained, the extension of the consumable electrode 1 is somewhat shorter and is equal to $l_2$. This is partly caused by metal evaporation from the end face 3 of the electrode 1 owing to an increased current density in the compressed welding arc 8.

If the welding process is continued after the beginning of fusion and drop transfer of the metal of the consumable electrode 1 (FIGS. 5, 6 and 7), a weld spot 11 is obtained with a reinforcement in the form of an enlargement 12. The extension of the consumable electrode 1 in this case will be still smaller, equal to $l_3$ (FIG. 7). Then the arc 8 is deenergized, and the welding is stopped.

Therefore, depending on the process objective the weld spot 11 can be obtained either with a reinforcement in the form of the enlargement 12 (FIG. 7) or without it (FIG. 4).

The process of arc spot welding according to the invention is carried out with a current density in the consumable electrode 1 (FIG. 1) above 250 A/mm². The consumable electrode 1 may be in the form of both continuous and powder wires in the form of single, composite or twisted wires of consumable electrodes 1.

The method according to the invention will now be illustrated by specific examples of its practical implementation.

EXAMPLE 1

A lap joint of 2 to 4 mm thickness was welded by electrical arc submerged spot welding. The material of the base metal was hot-rolled low-carbon non-ground steel, the wire (consumable electrode 1) material was a low-carbon steel. The joint was assembled with a clearance of 0.3 mm.

| Welding conditions | |
| --- | --- |
| Consumable electrode diameter (mm) | 3.0 |
| Consumable electrode extension (mm) | 30 |
| Welding current (A) | 2800 |
| Welding time (s) | 0.05 |

The welding arc was deenergized before starting transfer of the metal of the electrode 1 to the weld spot 11. As a result, the weld spot 11 with the outside diameter of 12.0 mm and diameter in the zone of transition from one sheet being connected to the other (the core zone) of 9.0 mm was obtained. The extension of the consumable electrode was reduced to 1 by 2 mm after the welding.

The resultant weld plug did not have reinforcement in the form of an enlargement, nor there were any internal or external flaws.

EXAMPLE 2

The same joint as described in Example 1 was welded by submerged arc spot welding, but with a weld plug 11 (FIG. 7) was produced with a reinforcement in the form of the enlargement 12.

| Welding conditions | |
| --- | --- |
| Consumable electrode diameter (mm) | 3.0 |
| Consumable electrode extension (before welding) (mm) | 30 |
| Consumable electrode extension after welding (mm) | 25 |
| Welding current (A) | 2800 |
| Welding time (s) | 0.1 |

The welding arc 8 was deenergized after the beginning of transfer of the electrode metal to the weld bath and formation of the reinforcement 12 over the weld spot 11 in the form of an enlargement.

As a result of the welding, a weld plug (weld spot 11) was obtained having a core diameter between sheets being welded equal to 10 mm with the outside diameter of 13 mm, with the height of the reinforcement from 1.2 to 1.5 mm.

EXAMPLE 3

A lap joint 1.2 to 3.0 mm thick was welded by spot welding in carbon dioxide. The base metal material was hot-rolled low-carbon steel without grinding, the wire (consumable electrode 1) material was a low-alloy steel.

| Welding conditions | |
| --- | --- |
| Consumable electrode diameter (mm) | 2.0 |
| Current density in the electrode 1 (A/mm$^2$) | 400 |
| Welding time (s) | 0.05 |

As a result of the welding a weld plug with the outside diameter of 7.0 mm and with the diameter of 5.5 mm in the zone of transition from one sheet being connected to the other (core zone) was produced.

The weld plug did not have reinforcement (enlargement), nor did it have any internal or external flaws.

Mechanical properties of the resultant welded spot joints complied with all requirements imposed thereupon.

The method according to the invention may be advantageously used both for consecutive individual spot welding and with the simultaneous parallel multiple spot welding using one or several parallel-connected power supply sources. The product 7 in which the fused part 5 consists of two or more layers may also be welded.

The method according to the invention may also be used in welding other types of joints such as corner and tee joints.

The method of electrical arc spot welding which is carried out according to the invention with the feeding of the consumable electrode 1 (FIG. 2) into the fusion space 9 by swiftly bringing the current carrying device 2 close to the surface 4 of the part 5 at a speed exceeding the rate of fusion of the electrode 1 ensures the conduct of the process with the submergence of the end face 3 of the consumable electrode 1 into the fusion space 9 below the surface 4 of the part 5 being fused. Thus conditions are provided which guarantee a material increase in the concentration of heat release at the weld spot 11 (FIGS. 4, 5, 6 and 7) so that the welding cycle is tenfold and even more shorter, the consumption of welding materials is reduced, electric energy consumption is several times lower, welding deformations are substantially reduced and quality of welded joints and external appearance of products are better. The method also makes it possible to produce weld spots 11 without reinforcement so that it can be used in a number of applications to replace resistance spot welding which calls for employment of more expensive and unwieldy equipment and for more stringent requirements imposed upon product preparation before welding.

In addition, owing to a very small volume of molten metal at the weld spot 11, the method according to the invention may be advantageously used in welding metal over a wide range of thickness at any position in space.

INDUSTRIAL APPLICABILITY

The invention may be used for the manufacture of products and structures using spot and plug weld welded joints in various protecting atmospheres and positions in space.

We claim:

1. A method of electrical arc spot welding with a consumable electrode, comprising securing a consumable electrode (1) in a current carrying device (2), positioning the consumable electrode (1) over a surface (4) of a part (5) to be fused, firing a welding arc (8) between an end face (3) of the consumable electrode (1) and the surface (4) of the part (5) being fused, moving the current carrying device (2) with the consumable electrode secured therein towards the surface (4) of the part (5), and carrying out the welding with the formation of a weld spot (11), wherein the feeding of the consumable electrode (1) to the fusion space (9) is produced by an accelerated movement of the current carrying device (2) in a direction to the surface (4) of the part (5) at a speed exceeding the rate of fusion of the electrode.

2. A method of electrical arc spot welding with the consumable electrode as set forth in claim 1, wherein an accelerated motion of the current carrying device (2) towards the surface (4) of the part (5) immerses the end face (3) of the electrode (1) into the fusion space (9) below the level of the surface (4) of the part (5), and the welding is carried out beginning with the moment the welding arc (8) is fired and until the moment the transfer of the metal of the consumable electrode (1) to the weld spot (11) begins.

* * * * *